United States Patent
Belch

(10) Patent No.: US 7,893,665 B2
(45) Date of Patent: Feb. 22, 2011

(54) PEAK CHARGING CURRENT MODULATION FOR BURST MODE CONVERSION

(75) Inventor: Mark Anthony Belch, Merrimack, NH (US)

(73) Assignee: Linear Technology Corporation, Milpitas, CA (US)

( * ) Notice: Subject to any disclaimer, the term of this patent is extended or adjusted under 35 U.S.C. 154(b) by 31 days.

(21) Appl. No.: 11/219,722

(22) Filed: Sep. 7, 2005

(65) Prior Publication Data

US 2007/0052395 A1    Mar. 8, 2007

(51) Int. Cl.
    *G05F 1/10*    (2006.01)
    *G05F 1/56*    (2006.01)

(52) U.S. Cl. ................. 323/222; 323/282; 323/284; 323/224

(58) Field of Classification Search .......... 323/222, 323/282, 284, 224
    See application file for complete search history.

(56) References Cited

U.S. PATENT DOCUMENTS

| | | | | |
|---|---|---|---|---|
| 5,506,493 | A | * | 4/1996 | Stengel ................ 323/223 |
| 6,031,743 | A | * | 2/2000 | Carpenter et al. ......... 363/65 |
| 6,037,755 | A | * | 3/2000 | Mao et al. ............. 323/222 |
| 6,222,352 | B1 | * | 4/2001 | Lenk .................. 323/267 |
| 6,320,358 | B2 | * | 11/2001 | Miller ................. 323/222 |
| 6,348,779 | B1 | * | 2/2002 | Sluijs ................. 323/222 |
| 6,600,300 | B2 | * | 7/2003 | Groeneveld et al. ....... 323/282 |
| 6,636,022 | B2 | * | 10/2003 | Sluijs ................. 323/222 |
| 6,724,174 | B1 | | 4/2004 | Esteves et al. |

FOREIGN PATENT DOCUMENTS

| | | |
|---|---|---|
| JP | 2003-507997 | 2/2003 |
| JP | 2005-192312 | 7/2005 |

OTHER PUBLICATIONS

International Search Report and Written Opinion issued in corresponding International Application No. PCT/US2006/027094, dated Jul. 13, 2006.
U.S. Appl. No. 11/052,473, filed Feb. 8, 2005, Flatness et al.
"Micropower Synchronous Buck-Boost DC/DC Converter" Linear Technology LTC3440, pp. 1-20.

* cited by examiner

*Primary Examiner*—Bao Q Vu
(74) *Attorney, Agent, or Firm*—McDermott Will & Emery LLP

(57) ABSTRACT

During burst mode operation of a four switch buck-boost converter, the input voltage and an output voltage can be detected and a preset peak charging current threshold level can be modulated when the difference between the input voltage and output voltage is within a prescribed range. A burst mode charging cycle will progress until the modulated peak charging threshold level is attained and cut off at the set peak level. A charge transfer cycle and discharge cycle may proceed thereafter.

16 Claims, 4 Drawing Sheets

PEAK CHARGING CURRENT MODULATION FOR BURST MODE CONVERSION

RELATED APPLICATIONS

This application contains subject matter related to copending U.S. application Ser. No. 11/052,473 of Flatness et al., filed Feb. 8, 2005, commonly assigned with the present application. The disclosure of that application is incorporated herein.

TECHNICAL FIELD

The present disclosure relates to switching regulators, more particularly to the control of a peak charging current threshold during burst mode operation.

BACKGROUND

Voltage regulators are known that can convert from input voltages above, below, or equal to the controlled output voltage, respectively performing buck mode regulation, boost mode regulation, or buck-boost mode regulation. Regulator architecture typically is provided for power supplies for automotive applications, lap-top computers, telecom equipment and distributed power systems. A known "four-switch" buck-boost converter is described in an October 2001 datasheet for the LTC3440 "Micro-power Synchronous Buck-Boost DC/DC Converter" integrated circuit manufactured by Linear Technology Corporation. Two of the four switches are connected to the input side of an inductor, the other switches connected to the output side. In accordance with the level of voltage output to be controlled and the level of voltage input, the regulator has the capability of assuming a plurality of operation states in which the switches variously are sequentially activated or deactivated, to connect the inductor to the input, the output, and/or a common ground connection.

FIG. 1 is a simplified schematic diagram of a four switch regulator, such as the LTC3440. Four controllable switches are represented by blocks labeled A-D. Inductor 10 is coupled at one end to input voltage $V_{IN}$ via "A" switch 12 and to a common terminal via "B" switch 14. At its other end, inductor 10 is coupled to the output $V_{OUT}$ via "D" switch 16 and to the common terminal via "C" switch 18. During normal load buck mode operation, the inductor is repetitively switched between an "AD" charging cycle, in which switches 12 and 16 are closed and switches 14 and 18 are open, and an "BD" discharging cycle in which switches 14 and 16 are closed and switches 12 and 18 are open. This mode maintains $V_{OUT}$ at a lower level than $V_{IN}$. During normal load boost mode operation, the inductor is repetitively switched between an "AC" charging cycle, in which switches 12 and 18 are closed and switches 14 and 16 are open, and the AD cycle in which charge is transferred to the output. This mode maintains $V_{OUT}$ at a higher level than $V_{IN}$. During normal load buck-boost mode operation, the inductor typically is repetitively switched among three cycles, the AC charging cycle, the AD charge transfer cycle, and the BD discharge cycle. This mode maintains $V_{OUT}$ at or near the level of $V_{IN}$.

In many portable systems, when the output load is light and the output voltage is at its regulation voltage, switching regulators are controlled to go into a power saving burst mode operation. An output capacitor allows shut off of all unnecessary functions to significantly reduce quiescent current. This state is commonly called a "sleep" state. When output voltage drifts lower to a programmed level below the regulation level, the regulator "wakes up" and delivers a burst of energy to the output capacitor until the output voltage is back to regulation voltage and returns to the sleep state. The intermittent cycling repeats until the burst mode terminates in response to increased output load conditions.

The four switch converter architecture suffers from reduced efficiency accruing from switching losses when all four switches are operational. The need thus exists for improving the efficiency of such converters.

SUMMARY OF THE DISCLOSURE

During burst mode operation, the input voltage and an output voltage of the converter can be detected and a preset peak charging current threshold level can be modulated when the difference between the input voltage and output voltage is within a prescribed range. The charging cycle will progress until the modulated peak charging threshold level is attained and cut off at the set peak level. The charge transfer cycle and discharge cycle proceed thereafter.

The threshold charging current threshold can be represented by a sum of two current sources from which a voltage threshold for a comparator input can be derived. A voltage related to the charging current can be applied to a second input of the comparator. One of the two current sources may be fixed, the other variable. The preset peak charging current threshold level corresponds to the sum of the two current sources when the variable current source is at a maximum. The threshold can be modulated by generating a signal related to the difference between the converter input and output voltages and adjusting the variable current source in response to the generated signal when the generated signal is within a set range. The variable current source is decreased from its maximum at the maximum of the range to zero when the output voltage is equal to the input voltage. Thus, the peak charging current level threshold is set to its minimum when the voltage difference is zero. The preset threshold level may be set at one value if the input voltage exceeds the output voltage outside the prescribed range and at another value if the output voltage exceeds the input voltage outside the prescribed range.

The converter may be configured with a controller coupled to activate and deactivate the inductor coupled switches. A reference level setting circuit is coupled to the input and output terminals. A first input of a comparator may be coupled to a sensor that detects the inductor current. A second input of the comparator is coupled to an output of the reference level setting circuit. The comparator output is coupled to the controller. The controller is responsive to the comparator to activate and deactivate appropriate switches.

The reference level setting circuit may comprise a voltage differential circuit coupled to the input and output terminals and a modulation circuit coupled to an output of the voltage differential circuit. An output of the modulation circuit establishes a peak charging current threshold level for the comparator. The modulation circuit may comprise a fixed current source coupled with a variable current source circuit at an output point of the modulation circuit. The variable current source circuit may comprise a second fixed current source coupled in series with a transistor and a third fixed current source across a power supply, a control terminal of the transistor coupled to the voltage differential circuit output. A current transmission circuit may be coupled between the modulation circuit output point and a junction of the third fixed current source and the transistor.

BRIEF DESCRIPTION OF THE DRAWINGS

Implementations of the present invention are illustrated by way of example, and not by way of limitation, in the figures of the accompanying drawings and in which like reference numerals refer to similar elements.

DETAILED DESCRIPTION

Figure 1:
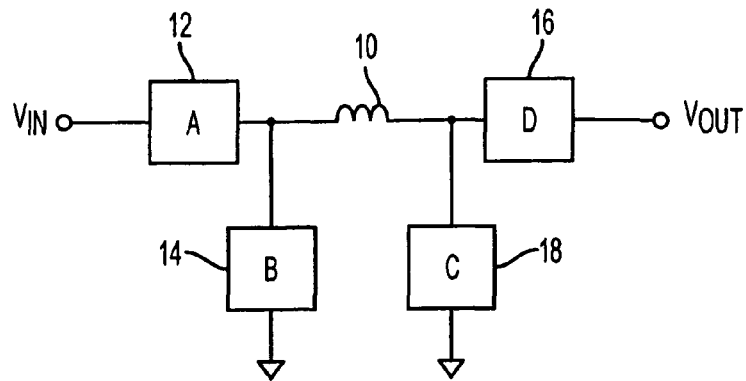
FIG. 1 is a simplified schematic diagram of a known four switch regulator.
Figure 2:
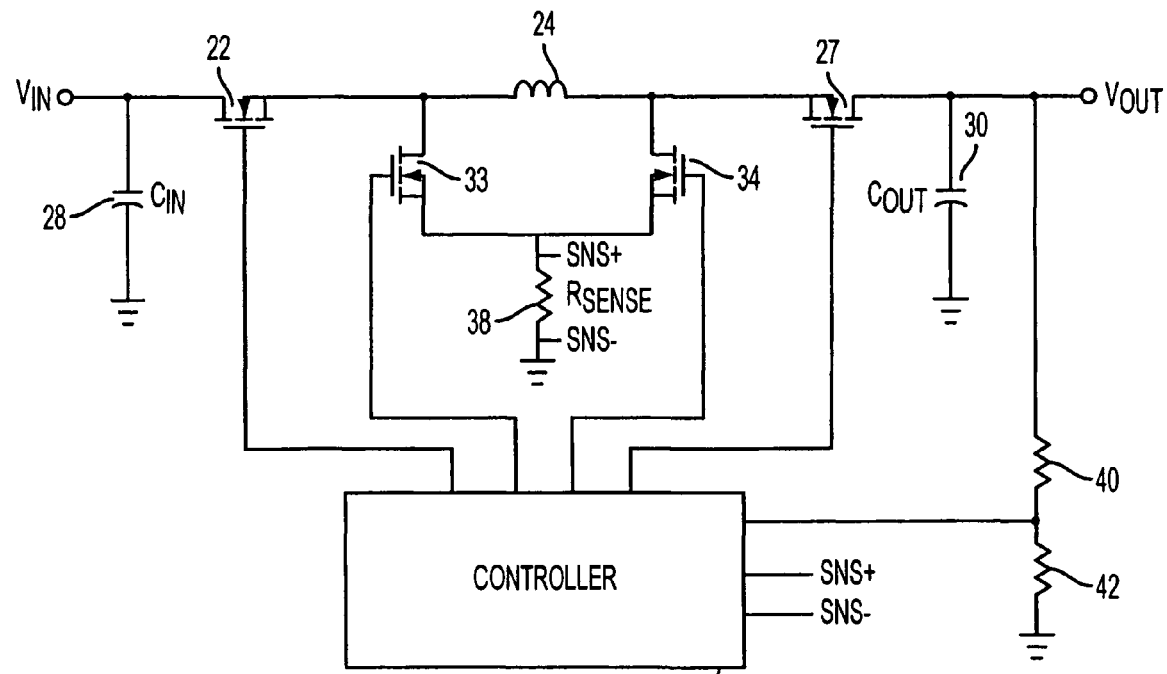
FIG. 2 is a partial schematic block diagram of a switching regulator that may be used with the present invention.

An input voltage $V_{in}$ from a power supply is applied to an input terminal in FIG. 2. A regulated output voltage $V_{out}$ is applied to the output terminal. Connected in series between the input and output terminals are a first switch 22, inductor 24, and second switch 27. An input capacitor 28 is connected between the input terminal and the common ground. An output capacitor 30 is connected between the output terminal and the common ground. A third switch 33 is connected between the junction of switch 22 and the inductor and sense resistor 38. A fourth switch 34 is connected between the junction of inductor 24 and switch 27 and the resistor 38. Resistor 38 is connected to ground. Voltage divider resistors 40 and 42 are connected in series between the output terminal and the common ground. The switches are exemplified as MOSFETs, although any controlled switching devices may be utilized.

An input of controller 44 is coupled to the junction between resistors 40 and 42, thereby to receive an output feedback voltage at resistor 42. The voltage at resistor 42 is proportional to the output voltage. Inputs SNS+ and SNS− of controller 44 receive the voltage across resistor 38, which represents sensed inductor current. In response to these inputs, the controller 44 outputs signals for activation and deactivation of switches 22, 27, 33 and 34 for the various modes of operation, for example, as described in the above-identified copending U.S. application Ser. No. 11/052,473.

A converter, such as the LTC3440, is capable of providing efficient operation in buck mode, boost mode, and buck-boost mode. The mode of operation is defined by whether the predetermined regulation output voltage is greater or less than the input voltage and the magnitude of the voltage differential therebetween. In each of these modes, a sleep state, burst mode operation is imposed during light load conditions. During light load, low inductor current is required to maintain the output voltage at regulation level. The controller is responsive to high output voltage and low current to transition to the burst mode.

In burst mode, if $V_{IN}$ is near $V_{OUT}$, when $V_{OUT}$ drifts to a level below the regulation output voltage, an AC cycle is initiated. Switches 22 and 34 are activated to apply a charging current to inductor 24 until a peak current, $I_{peak}$, is reached. At that point an AD cycle commences. Switch 34 is deactivated and switch 27 is activated to couple the inductor 24 between the input and the output. Energy stored in the inductor is transferred to output capacitor 30 to build up the output voltage. The AD cycle continues for a set period or earlier if the voltage output rises to regulation level. The BD cycle is then imposed. Switch 22 is deactivated and switch 33 is activated to couple inductor 24 between the output and ground. All remaining energy in the inductor is discharged to the output. If the voltage has not reached the regulation level, the succession of AC cycle, AD cycle, and BD cycle continues.

Figure 3A:
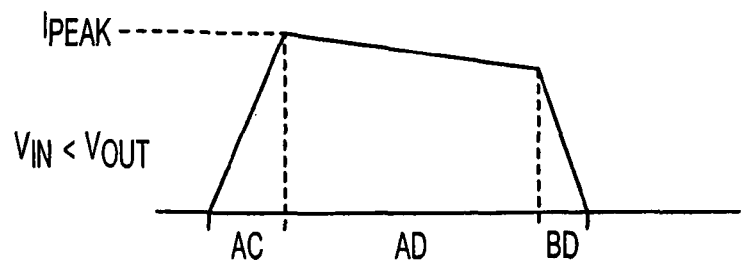
FIGS. 3A-3C illustrate current waveforms for different relationships between $V_{OUT}$ and $V_{IN}$ of the regulator schematically illustrated in FIG. 1.
Figure 3B:
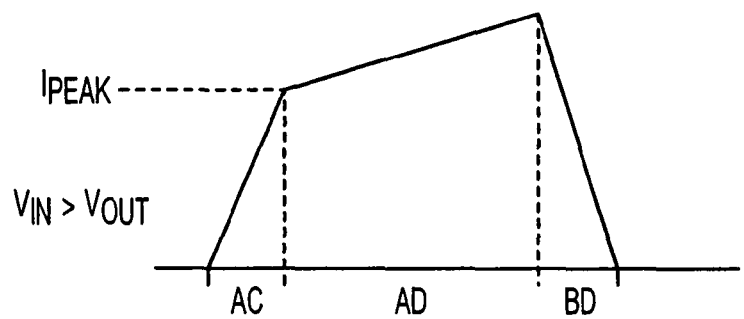
Figure 3C:
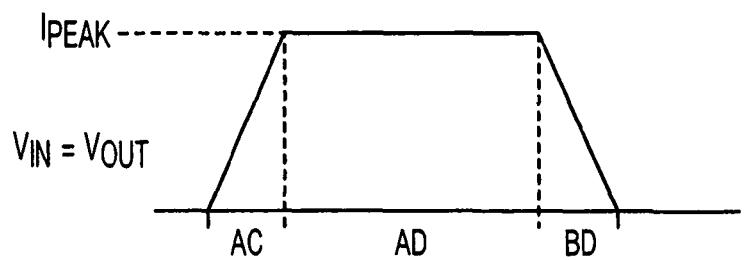

The change in inductor current per unit time is equal to the voltage across the inductor. FIGS. 3A-3C illustrate inductor current waveforms for different relationships between $V_{OUT}$ and $V_{IN}$. FIG. 3A corresponds to operation during which the input voltage is less than the output voltage. The AC cycle is applied to charge the inductor until an $I_{peak}$ level is reached. The AD cycle then commences and the current level during this cycle decreases because $V_{OUT}$ is greater than $V_{IN}$. In the BD cycle, current reduces to zero and the inductor is discharged. FIG. 3B corresponds to operation during which the input voltage is greater than the output voltage. The AC cycle is applied to charge the inductor until the $I_{peak}$ level is reached. The AD cycle then commences and the current level during this cycle increases because $V_{OUT}$ is less than $V_{IN}$. FIG. 3C corresponds to operation during which the input voltage is the same as the output voltage. The AC cycle is applied to charge the inductor until the $I_{peak}$ level is reached. The AD cycle then commences and the current level during this cycle is substantially constant because $V_{OUT}$ is equal to $V_{IN}$.

Figure 4:
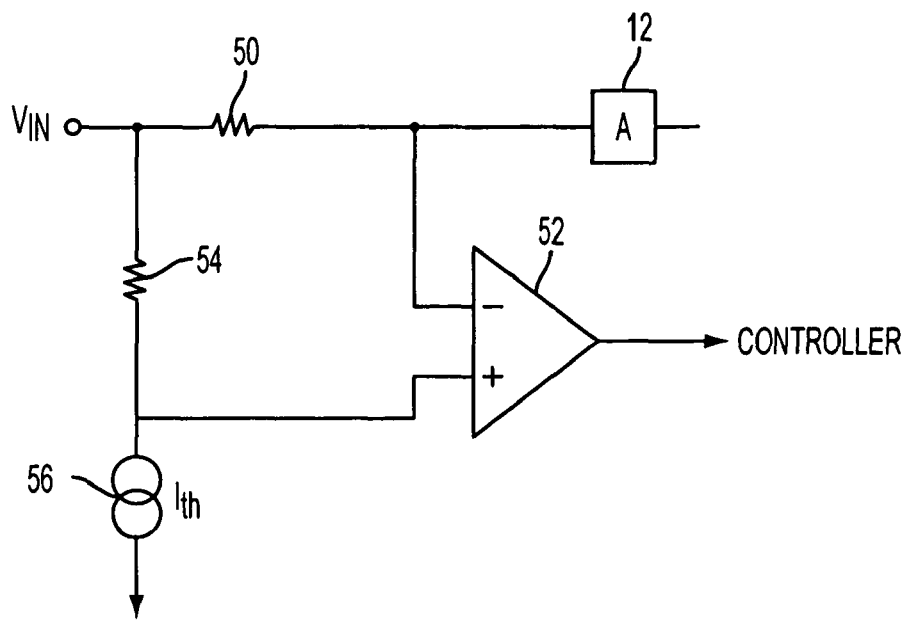
FIG. 4 is a schematic diagram of a current limiting circuit that may be utilized with the regulator of FIG. 2.

During the AD burst mode cycle, when the voltage across the inductor is close to zero there is little or no change in current. Thus the value of the charging current peak value $I_{peak}$ can be reduced and still provide enough energy per switching cycle to satisfy the output voltage. Reduced peak current results in smaller conduction losses during the energy transfer cycle and, thus, increased efficiency. FIG. 4 is a schematic diagram of a current limiting circuit that may be utilized with the regulator of FIG. 2 to modulate the set value of $I_{peak}$ to obtain this benefit. Current sensing resistor 50 is shown connected between the input terminal and the "A" switch 12. Switch 12 corresponds to switch 22 of FIG. 2. Resistor 50 may correspond to the current sense resistor 38 of FIG. 2 or a separate inductor current sensor. The junction of resistor 50 and switch 12 is connected to a negative input of comparator 52. Coupled between the voltage input terminal and ground is a series connection of resistor 54 and variable current source 56, the junction therebetween connected to a positive input of the comparator 52. The output of the comparator is coupled to the controller 44 of FIG. 2.

The current $I_{th}$ through resistor 54 sets a reference voltage threshold for comparator 52. The current through switch 12 sets up a corresponding voltage across resistor 50. $I_{peak}$ current is the current through switch A that makes the voltage across resistor 50 the same as the voltage threshold of resistor 54. During the burst mode AC charging cycle, the controller is responsive to a high output of comparator 52 to maintain switches 22(A) and 34 (C) activated. Current increases through resistor 50 until the comparator threshold is reached at the current level $I_{peak}$. A low comparator output is then generated. In response, the controller deactivates switch 34 and activates switch 27 (D). The threshold current source 56 is controlled to vary when the difference between the converter input voltage and output voltage is within a prescribed range centered at zero volt differential. $I_{th}$ is minimum at zero volt differential and increases as the differential approaches the range limits.

Figure 5:
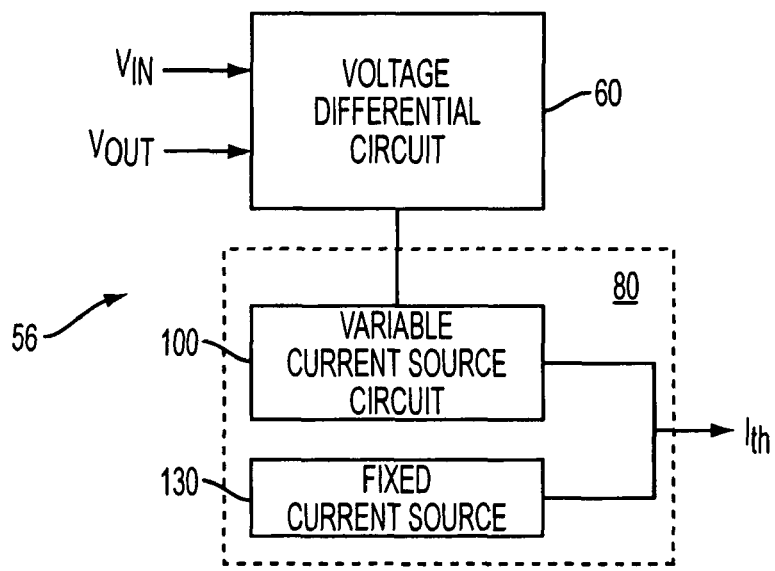
FIG. 5 is a block diagram of a variable current threshold control for the circuit of FIG. 4.

FIG. 5 is a block diagram of a variable threshold control for setting the level of the threshold current of the current source 56. Voltage differential circuit 60, having inputs coupled to $V_{IN}$ and $V_{OUT}$, applies a differential output signal to variable current source 100. Modulation circuit 80 comprises the variable current source circuit 100 and fixed current source 130, which are added to produce the threshold current $I^{th}$. $I^{th}$, as a function of the voltage differential $V_{IN}-V_{OUT}$, is plotted in FIG. 6. Variable current source circuit 100 is responsive to voltage differential circuit 60 to produce no current when $V_{IN}$ and $V_{OUT}$ are equal. At zero voltage differential, threshold current is produced only by fixed current source 130, represented by a level $I_X$. As the voltage differential increases in a positive or negative sense, the current produced by variable current source circuit 100 increases relatively linearly until a maximum current level $I_Y$ is attained. Threshold current $I_{th}$ reaches its maximum level, $I_X+I_Y$ at voltage differential values $-\Delta_Y$ and $+\Delta_Y$ and remains at the maximum level outside this voltage differential range. The peak value of the burst mode AC charging current thus is set to a minimum level when the voltage across inductor 24 is zero. The peak charging current is set to a higher level in accordance with inductor voltage to provide sufficient charge transfer during the AD cycle.

Figure 6:
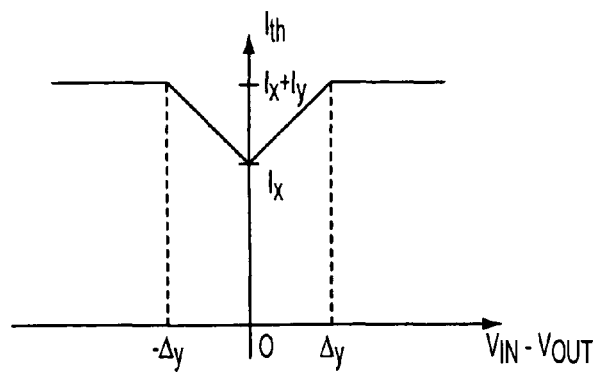
FIG. 6 is a chart illustrative of peak charging current as a function input/output voltage differential in accordance with the present invention.
Figure 7:
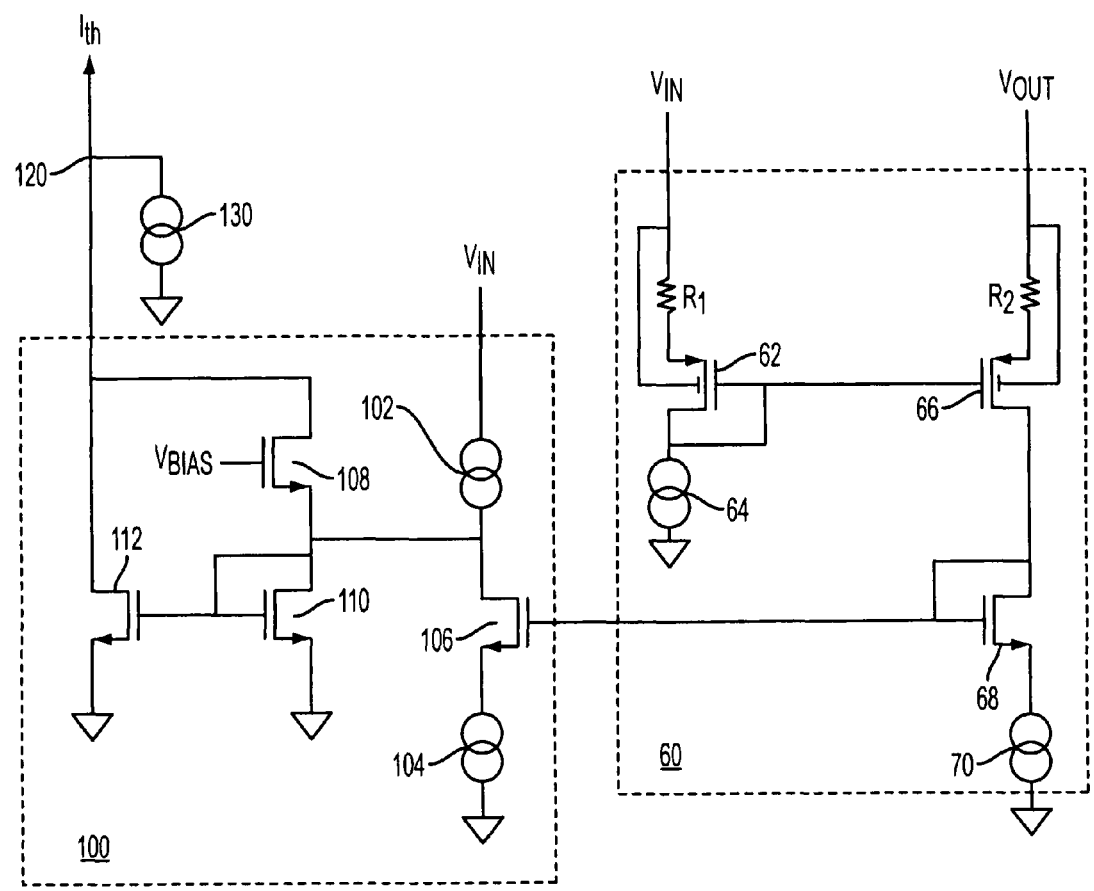
FIG. 7 is a circuit diagram of an example circuit that may be used to implement the variable current threshold of FIG. 5.

An example circuit for implementing the variable current threshold of FIG. 5 is illustrated in FIG. 7. Coupled between the voltage input and ground, in voltage differential circuit 60, are resistor R1 transistor 62 and fixed current source 64. Coupled between the voltage output and ground are resistor R2, transistor 66, transistor 68 and fixed current source 70. The gate of transistor 66 is connected to the gate of transistor 62 and to the junction of transistor 62 and current source 64. The drain and gate of transistor 68 are connected together. In the variable current source circuit 100, coupled between the voltage input and ground are fixed current sources 102 and 104 and transistor 106. For comparison with the waveform of FIG. 6, the current level of current source 102 may be set to $I_Y$ and the current level of current source 104 may be set to $2I_Y$. The gate of transistor 106 is connected to the gate and drain of transistor 68. The drain of transistor 106 is connected to a junction of transistors 108 and 110. The drain and gate of transistor 110 are connected together. The source of transistor 110 is grounded. The gate of transistor 108 is set to a bias voltage $V_{BIAS}$. The drain of transistor 108 is connected to the drain of transistor 112, whose source is grounded. The gate of transistor 112 is connected to the gate and drain of transistor 110. The junction of transistors 108 and 112 is connected to fixed voltage source 130 at output node 120. The current level of current source 130 may be set to $I_X$.

The output node 120 is coupled to resistor 54 and the positive input of comparator 52 of FIG. 4. In operation, when the converter output voltage $V_{OUT}$ is significantly greater than the converter input voltage $V_{IN}$, $(-\Delta_Y)$, transistors 66 and 68 are fully conductive. Transistor 106 is fully biased and transistor 108 is biased conductive. As transistor 106 is biased to sink the $2I_Y$ current of current source 104, and the current drawn from current source 102 is $I_Y$, transistor 108 will carry a current of $I_Y$. Transistors 110 and 112 are non-conductive. As the current $I_{th}$ at output node 120 is the sum of the current of current source 130 and the current through transistor 108, the threshold $I_{peak}$ is $I_X+I_Y$.

When the converter output voltage $V_{OUT}$ is significantly less than the converter input voltage $V_{IN}$, $(+\Delta_Y)$, transistors 66, 68, 108 and 106 are non-conductive. The current of current source 102, $I_Y$, is carried by transistor 110 and mirrored to transistor 112. The current $I_{th}$ at output node 120 is the sum of the current of current source 130 and the current through transistor 112, $I_X+I_Y$. Thus, $I_{peak}$ is set to the maximum level, $I_X+I_Y$, when the absolute value of voltage differential between the converter output and input is greater than $\Delta_Y$. The transistors 108, 110 and 112 form a current transmission circuit of the variable current source circuit 100.

When the voltage differential is with the range of $-\Delta_Y$ to $+\Delta_Y$, transistors 68 and 106 will be conductive at levels between fully on and fully off. When the converter output voltage $V_{OUT}$ is equal to the converter input voltage $V_{IN}$, transistor 104 will conduct half the current of the current source 104, $I_Y$, which is sunk in total by current source 102. Neither transistor 108 nor transistor 112 will be conductive. The current $I_{th}$ at output node 120 will be the value of the current source 130, $I_X$. This level is the minimum value of $I_{peak}$. As the converter voltage differential increases between zero and $+\Delta_Y$, transistor 106 becomes less conductive and the current from current source 102 is shunted at an increasing level to transistor 110, mirrored to transistor 112. $I_{th}$ increases accordingly. As the converter voltage differential decreases between zero and $-\Delta_Y$, transistor 106 becomes more conductive and draws increasing current via transistor 108. $I_{th}$ again increases accordingly. Thus, within the voltage differential modulation range, $I_{peak}$ increases linearly from a minimum at zero voltage differential to a maximum at a voltage differential at an absolute value of $\Delta_Y$.

In this disclosure there are shown and described only preferred embodiments of the invention and but a few examples of its versatility. It is to be understood that the invention is capable of use in various other combinations and environments and is capable of changes or modifications within the scope of the inventive concept as expressed herein. For example, adjustments can be made to the circuit of FIG. 7 to change the relative levels of $I_X+I_Y$, and the voltage differential modulation range. The $I_{th}$ waveform in the modulation range may be changed from a linear characteristic to a curve of a different characteristic.

As a specific example, the relationship between fixed current sources 102 and 104 can be adjusted. If the current level of source 104 is changed to $1.5I_Y$ while the current level of source 102 remains at $I_Y$, $I_{peak}$ will attain a maximum level $I_X+0.5I_Y$ when $V_{OUT}$ is greater than $V_{IN}$ but will attain the maximum level $I_X+I_Y$ when $V_{OUT}$ is less than $V_{IN}$. If the current level of source 102 is changed to $1.5I_Y$ while the current level of source 104 remains at $2I_Y$, $I_{peak}$ will attain a maximum level $I_Y+0.5I_Y$ when $V_{OUT}$ is greater than $V_{IN}$ but will attain the maximum level $I_X+1.5I_Y$, when $V_{OUT}$ is less than $V_{IN}$.

Another adjustment can be to set the voltage differential modulation range of FIG. 6 to be asymmetrical about the zero volt point if a particular regulator has different burst mode charge transfer requirements.

What is claimed is:

1. A method of controlling a voltage converter having multiple switches and an inductive element coupled to the switches and charged with charging current until a peak current charging level is reached, the method comprising the steps of:
    comparing the peak current charging level with a preset peak charging current threshold level to control switching of the switches, detecting an input voltage and an output voltage of the converter; and
    modulating the preset peak charging current threshold level in accordance with a difference between the input voltage and the output voltage.

2. A method as recited in claim 1, further comprising burst mode control steps of:
    charging the inductive element until the peak current charging level is attained;
    transferring energy from the inductor to an output; and
    discharging the inductor.

3. A method as recited in claim 2, further comprising:

setting a voltage threshold level related to the peak current charging level;

sensing a voltage related to current in the inductive element;

comparing the sensed voltage to the voltage threshold level; and advancing from the charging step to the transferring step when the sense voltage approaches the voltage threshold level.

4. A method as recited in claim 3, wherein the modulating step comprises:

generating a signal related to the difference between the converter input and output voltages;

adjusting a variable current source in response to the generated signal; and adding the variable current source to a fixed current source to obtain a current threshold.

5. A method as recited in claim 1, wherein the step of modulating comprises decreasing the peak charging current threshold level from a preset level by an amount that varies with the absolute value of the difference between the input voltage and the output voltage.

6. A method as recited in claim 5, wherein the preset level is a first value if the input voltage exceeds the output voltage outside a prescribed range of the difference between the input voltage and the output voltage, and the preset level is a second value if the output voltage exceeds the input voltage outside the prescribed range.

7. A voltage converter comprising:

an input node and an output node;

an inductor charged with current until a peak level of inductor current is reached;

multiple controllable switches coupled to the inductor;

a controller having an output for controlling the switches;

a reference level setting circuit coupled to the input and output nodes to produce a variable reference level defining the peak level of the inductor current, the reference level being variable in accordance with a difference between input voltage at the input node and output voltage at the output node; and a comparator responsive to the inductor current and the reference level at an output of the reference level setting circuit to produce an output signal supplied to the controller to control switching of the switches when the inductor current reaches the peak level.

8. A voltage converter as recited in claim 7, wherein the comparator comprises:

a first input coupled to a current sensor;

a second input coupled to an output of the reference level setting circuit; and an output coupled to the controller.

9. A voltage converter as recited in claim 7, wherein the reference level setting circuit comprises:

a voltage differential circuit coupled to the input and output nodes; and a modulation circuit coupled to an output of the voltage differential circuit, an output of the modulation circuit setting the reference level for the comparator.

10. A voltage converter as recited in claim 9, wherein the modulation circuit comprises a fixed current source coupled with a variable current source circuit at an output node of the modulation circuit.

11. A voltage converter as recited in claim 10, wherein the variable current source circuit comprises a second fixed current source coupled in series with a transistor and a third fixed current source across a power supply, a control terminal of the transistor coupled to the voltage differential circuit output.

12. A voltage converter as recited in claim 11, wherein the variable current source circuit further comprises a current transmission circuit coupled between the modulation circuit output node and a junction of the third fixed current source and the transistor.

13. A method as recited in claim 1, wherein the multiple switches includes a first switch coupled between an input of the converter and a first electrode of the inductive element, a second switch coupled between the first electrode of the inductive element and a common node, a third switch coupled between a second electrode of the inductive element and the common node, and a fourth switch coupled between the second electrode of the inductive element and an output of the converter.

14. A method as recited in claim 13, wherein the first and third switches are activated to connect the inductive element between the input of the converter and the common node when the inductive element is charged, and the first and fourth switches are activated to connect the inductive element between the input of the converter and the output of the converter when the charging current reaches the peak current charging level.

15. A voltage converter as recited in claim 7, wherein the multiple switches includes a first switch coupled between the input node of the converter and a first electrode of the inductor, a second switch coupled between the first electrode of the inductor and a common node, a third switch coupled between a second electrode of the inductor and the common node, and a fourth switch coupled between the second electrode of the inductor and the output node of the converter.

16. A voltage converter as recited in claim 15, wherein the first and third switches are activated to connect the inductive element between the input of the converter and the common node when the inductor is being charged, and the first and fourth switches are activated to connect the inductor between the input node and the output node when the inductor current reaches the peak level.

* * * * *